United States Patent [19]

Mangum, Jr.

[11] Patent Number: 4,981,120

[45] Date of Patent: Jan. 1, 1991

[54] LOW PROFILE INTERNAL COMBUSTION ENGINE, AND LAWNMOWER COMPRISING SAME

[76] Inventor: Travis Mangum, Jr., 2910 Cedarwood Dr., Durham, N.C. 27707

[21] Appl. No.: 348,966

[22] Filed: May 8, 1989

[51] Int. Cl.[5] .......................... F02P 1/02; F02B 75/24; F02N 3/02; A01D 34/68

[52] U.S. Cl. .......................... 123/149 D; 123/56 AC; 123/146.5 A; 123/149 C; 123/179 F; 123/185 B; 123/195 HC; 56/10.5; 56/17.5; 60/626

[58] Field of Search ...... 123/56 AC, 195 HC, 149 D, 123/149 C, 149 A, 149 R, 146.5 A, 179 C, 179 F, 179 SE, 185 A, 185 B, 185 BA; 56/10.5, 17.5; 60/626

[56] References Cited

U.S. PATENT DOCUMENTS

| | | | |
|---|---|---|---|
| 1,030,127 | 6/1912 | Redrup | 123/149 D |
| 1,181,247 | 5/1916 | Pope | 123/149 R |
| 1,407,519 | 2/1922 | Douglas | 123/56 AC |
| 2,074,545 | 3/1937 | Harmon et al. | 123/149 A |
| 2,150,026 | 3/1939 | Criley | 123/179 F |
| 2,208,972 | 7/1940 | Goodall | 56/17.5 |
| 3,165,256 | 1/1965 | Emmerich | 123/149 D |
| 4,458,472 | 7/1984 | Christopherson | 56/10.5 |
| 4,790,273 | 12/1988 | Oguri et al. | 123/195 HC |

FOREIGN PATENT DOCUMENTS

| | | | |
|---|---|---|---|
| 840782 | 6/1952 | Fed. Rep. of Germany | 123/149 R |
| 347744 | 3/1905 | France | 123/149 C |

*Primary Examiner*—Andrew M. Dolinar
*Attorney, Agent, or Firm*—Olive & Olive

[57] ABSTRACT

A low-profile internal combustion engine is disclosed, featuring a unitary flywheel spark generation and distributor assembly. A hydraulic starter system is disclosed which may be adapted to such internal combustion engine. The engine of the invention is particularly suitable for use in push-type lawnmowers, to provide a low-profile construction enabling mowing of landscape areas such as under low lying tree branches, beneath bushes, etc., which are otherwise inaccessible to high-profile conventional lawnmowers.

9 Claims, 12 Drawing Sheets

LOW PROFILE INTERNAL COMBUSTION ENGINE, AND LAWNMOWER COMPRISING SAME

BACKGROUND OF THE INVENTION

1. Field of the Invention

The present invention generally relates to internal combustion engines of compact configuration, and to starter systems for same, and in a specific aspect relates to a lawnmower of the so-called "rotary type" employing such a compact internal combustion engine and/or starter system.

2. Description of the Related Art

Lawnmowers of the so-called rotary type are widely employed. In such machines, a rotatable blade typically is mounted for horizontal rotation at the lower part of a vertically extending drive shaft extending through a housing. On the upper surface of the housing an internal combustion engine is mounted as the power source or drive means for the mower. Such housing typically also mounts a plurality of wheels and is attached to a handle for manual translation of the lawnmower assembly, by a user pushing or pulling the handle to move the housing and rotating blade over the lawn area to be mowed.

A common deficiency of such rotary type lawnmowers is that the internal combustion engine mounted on the top surface, or deck, of the housing typically has a height which in many instances prevents the mower from being adequately utilized to mow under low obstructions, such as fences, swings, bushes, low-lying tree branches, etc.

As a result of such "high-profile" engine lawnmower configurations, the user of the mower is reduced to trimming grass or lawn areas in the vicinity of such "hard to reach" locations by the use of other trimmer or shear devices, such as a string trimmer or hand shears. Such necessity increases the time required to mow the complete area including such hard to reach regions, entails the additional cost of utilizing other trimming devices, and involves the inconvenience of switching from the mower to such other trimming device in order to complete the mowing job.

Accordingly, it would be a substantial advance in the art to provide a "low profile" internal combustion engine amenable to mounting on the deck of a lawnmower housing, to provide an overall mower assembly of substantially reduced height as compared to conventional lawnmower apparatus.

It is therefore an object of the present invention to provide an internal combustion engine of compact configuration which is characterized by a low profile (low height), rendering it amenable to deployment in a corresponding low profile lawnmower apparatus.

It is another object of the present invention to provide a starter system for an internal combustion engine which is usefully employed with engines of the aforementioned low profile type.

Other objects and advantages of the present invention will be apparent from the ensuing disclosure.

SUMMARY OF THE INVENTION

The present invention relates in one aspect to a multiple cylinder, side-firing internal combustion engine having a compact configuration characterized by a low profile, which may be highly effectively utilized in application to a rotary type lawnmower, as the motive power means therefor.

In a specific embodiment, such internal combustion engine incorporates a timing and ignition assembly comprising a flywheel coaxially joined to the crankshaft of the engine, and comprising on a peripheral portion thereof diametrally opposite magnets, each aligned with its north and south ends in circumferentially spaced relationship to one another on the flywheel. The flywheel is constructed with a lower base portion of cylindrical shape having joined thereto a coaxial, generally cylindrically shaped upper portion of smaller diametral extent than the base portion, so that the peripheral part of the base portion extends radially outwardly beyond the upper portion, with such peripheral part comprising the diametrally opposite magnets.

Extending diametrally across the upper portion of the flywheel is an insulated conductor wire whose respective ends are at edges of the upper portion of the flywheel. Also provided on the top surface of the upper portion of the flywheel is a branch conductor joined to and extending radially, from a central part of the diametrally extending insulated conductor, to an edge of the upper portion of the flywheel, and its end at such edge preferably is spaced from each of the ends of the diametrally extending insulated conductor, by an arc length of about 90°.

In this ignition and timing assembly, a stator/coil unit is mounted in peripheral proximity to the flywheel, such stator/coil unit comprising a high tension conductor extending radially inwardly toward said flywheel above said base portion thereof and terminating in non-contacting proximity to the end of the branch insulated conductor at the edge of the upper portion of the flywheel. The stator/coil unit is electrically connected to a switchable circuit comprising a primary circuit short switch, point breaker means, and an oscillatory discharge capacitor, in series relationship with one another, such that when the primary circuit short switch is closed, the circuit is grounded for shutting off the engine when operating, and when the primary circuit short switch is closed, a high electromotive force is induced in the coil and transmitted to the branch insulated conductor and the diametrally extending conductor to the diametrally opposite ends thereof.

Mounted at approximately 90° arc lengths from the stator/coil unit are end portions of respective high tension wires, oriented to extend radially inwardly toward the upper portion of the flywheel, with the extremities of the high tension wires being in spaced relationship to the respective ends of the insulated conductor which extends diametrally across the upper portion of the flywheel. Each of these high tension wires is connected at a second end thereof to spark generating means associated with a separate respective cylinder of the engine. The spark generating means may for example comprise spark plugs mounted in the cylinders of the internal combustion engine in a conventional manner.

A further aspect of the invention relates to an internal combustion engine of the type described above, comprising the aforementioned ignition and timing system, mounted for operative rotation of a rotatable blade in a power lawnmower assembly.

Other aspects of the invention relate to hydraulic starter means which may be employed in conjunction with the low profile internal combustion engine of the invention, as for example in a lawnmower apparatus.

Still other features and aspects of the invention will be more fully apparent from the ensuing disclosure and appended claims.

DETAILED DESCRIPTION OF THE INVENTION, AND PREFERRED EMBODIMENTS THEREOF

Figure 1:
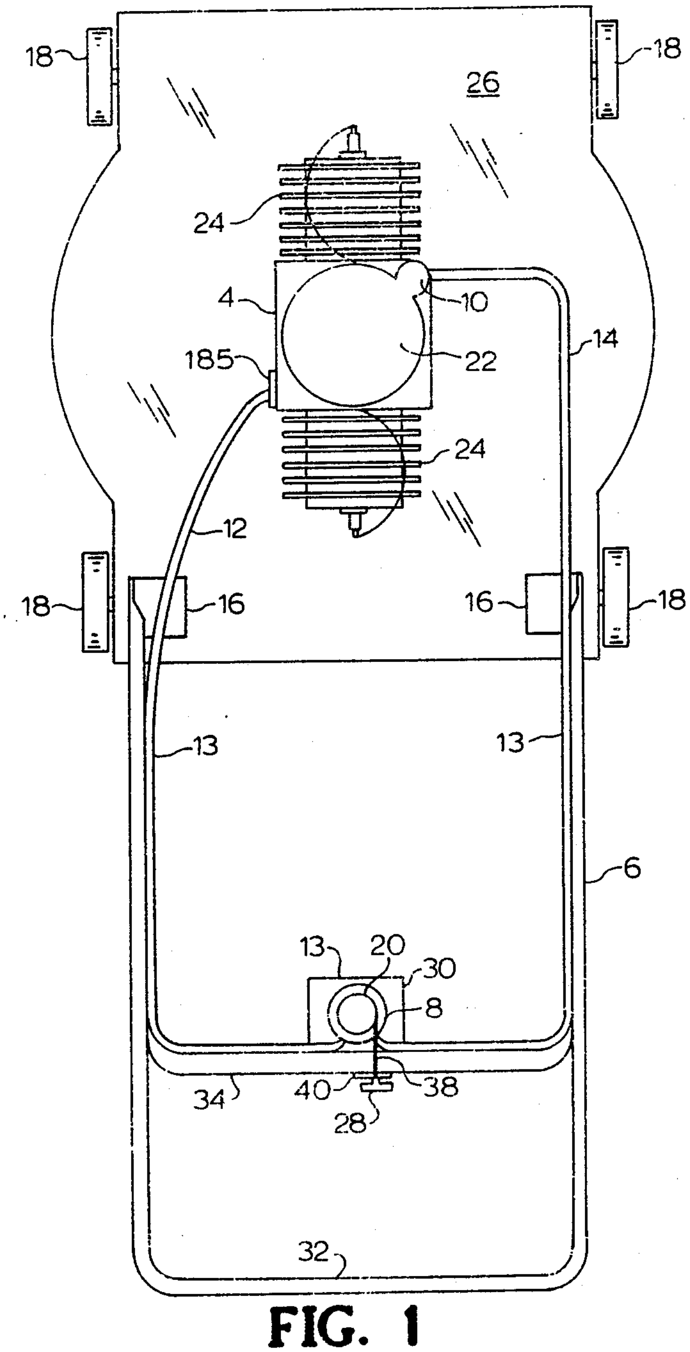
FIG. 1 is a top plan view of a lawnmower comprising a two-cylinder low profile internal combustion engine according to one embodiment of the present invention.

Referring now to the drawings, FIG. 1 shows a top plan view of a low profile lawnmower which comprises a low profile internal combustion engine according to one embodiment of the present invention. As illustrated, the lawnmower 2 comprises a housing on top surface of which is mounted a low profile internal combustion engine 4, at a generally central position of the housing top surface. Wheels 18 are attached to the respective corners of the housing 26 to accommodate translational movement of the lawnmower housing thereon.

At the rear portion of the lawnmower housing 26 are reposed two push handle attachment tabs 16. The attachment tabs are formed as right angle brackets, the horizontal portion of which is mechanically attached, or welded, to the housing top surface, and the vertical portion of which accommodates mechanical fastening means for securement of push handle 6 to the mower housing. The push handle is of a squared U-shape including transversely extending portion 32 serving as a manually grippable structure for pushing or pulling the lawnmower during its operation. In spaced relationship to the transversely extending portion 32 of the push bar is a transversely extending stabilizing bar 34 which is bent at its respective ends as illustrated to facilitate attachment to the push handle 6 by means of suitable mechanical fasteners.

A mounting plate 30 is joined by suitable means, such as mechanical fasteners, welding, or the like to a medial portion of the stabilizing bar 34.

Mounted on the mounting plate 30 is a peristaltic pump 8, hereinafter more fully described, featuring a recoil starter assembly 20 mechanically fastened to the upper housing of the peristaltic pump 8. The recoil starter assembly 20 comprises a recoil cord 38 which is attached at its exterior end to a pull handle 28 which reposes in a fully retracted position of the starter, against the recoil handle positioning plate 40. The positioning plate 40 is mechanically or otherwise secured to the stablizing bar 34.

Attached to the peristaltic pump in a nipple/clamp arrangement, is an oil uptake hose 12, and pressurized hose 14 is correspondingly secured to the peristaltic starter pump exit nipple.

In the lawnmower shown in FIG. 1, the wheels 18 may be secured to the housing 26 in an adjustable manner, permitting the height of the housing and rotary blade (not shown) within the housing to be positioned at a predetermined elevation relative to the ground surface which is to be mowed by the lawnmower. The transversely extending portion 32 of the handle is manually grasped and the mower is thereby pushed or pulled in a conventional manner to direct the mower in a selected direction over the landscape to be mowed. The blade attached to the low profile is rotated at the requisite rotational speed to effect cutting of the grass or other medium to be mowed.

The low profile internal combustion engine 4 is started by a peristaltic starting system comprising the peristaltic pump 8. The oil uptake hose 12 of this starting system is inserted into the engine crankcase such that the open end therein is submerged in the oil sump (not shown) of the engine. When the recoil starter handle 28 is pulled by the user of the lawnmower, a recoil starting assembly 20 engages and activates peristaltic pump 8 and supplies hose 14 with pressurized oil. This pressurized oil and hose 14 then is employed to power peristaltic starting motor 10 on the internal combustion engine. The peristaltic starting motor 10 engages the flywheel 22 of the internal combustion engine when the starting motor is supplied with pressurized oil, the starting motor thereby being capable of rotating flywheel 22 at sufficient angular velocity to initiate cranking of the internal combustion engine 4 for subsequent operation, e.g., in a cyclic operating mode such as the Otto cycle.

Figure 2:
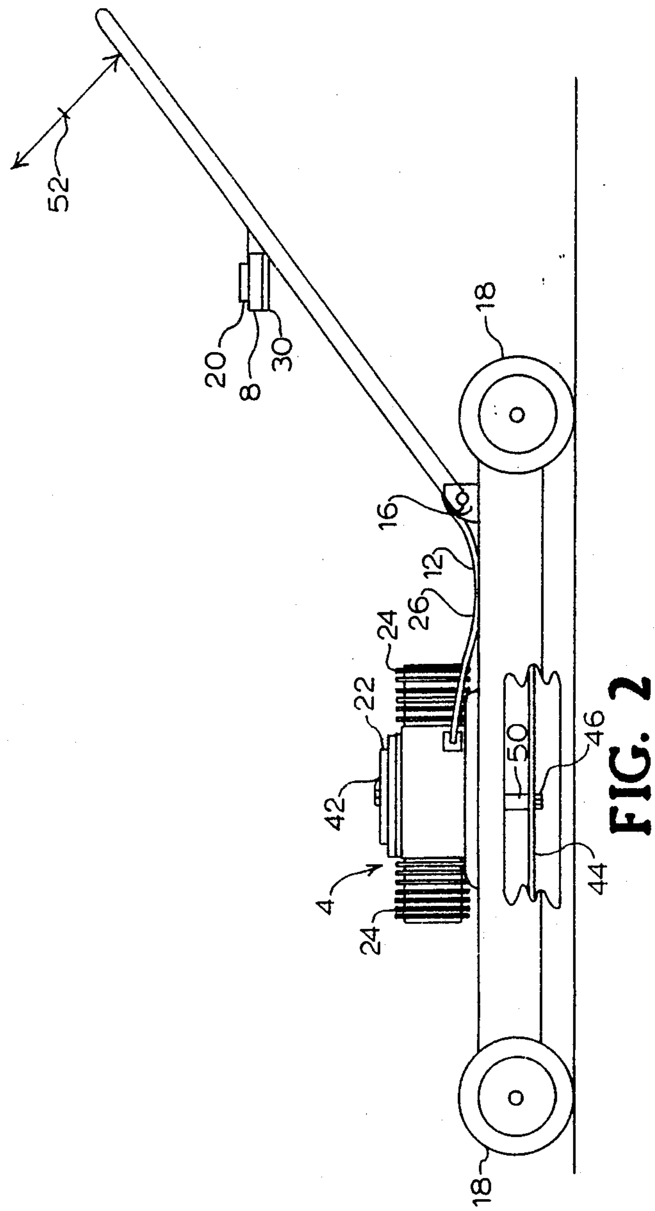
FIG. 2 is a side elevation view of the lawnmower of FIG. 1, with a lower portion of the housing partially broken away to show the details of the connection of the rotary blade to a lower portion of the crankshaft.

FIG. 2 is a side elevation view of the low profile lawnmower illustratively shown in FIG. 1, wherein all the parts and features shown in FIG. 1 are correspondingly numbered in FIG. 2. A lower portion of the housing in FIG. 2 is shown broken away to illustrate the details of attachment of the horizontally extending mowing blade 44 by means of a blade attachment bolt 46 to the lower end of crankshaft 50.

FIG. 2 also shows the details of construction of the push handle 6, as angularly mounted by the attachment tabs 16 at an angle relative to the generally horizontal surface of the mower housing. The attachment tabs 16 are constructed so that the handle accommodates movement in a limited arc 52, the attachment tabs featuring limit stop means of a conventional type, to prevent rotation of the push handle beyond arc 52.

Figure 3:
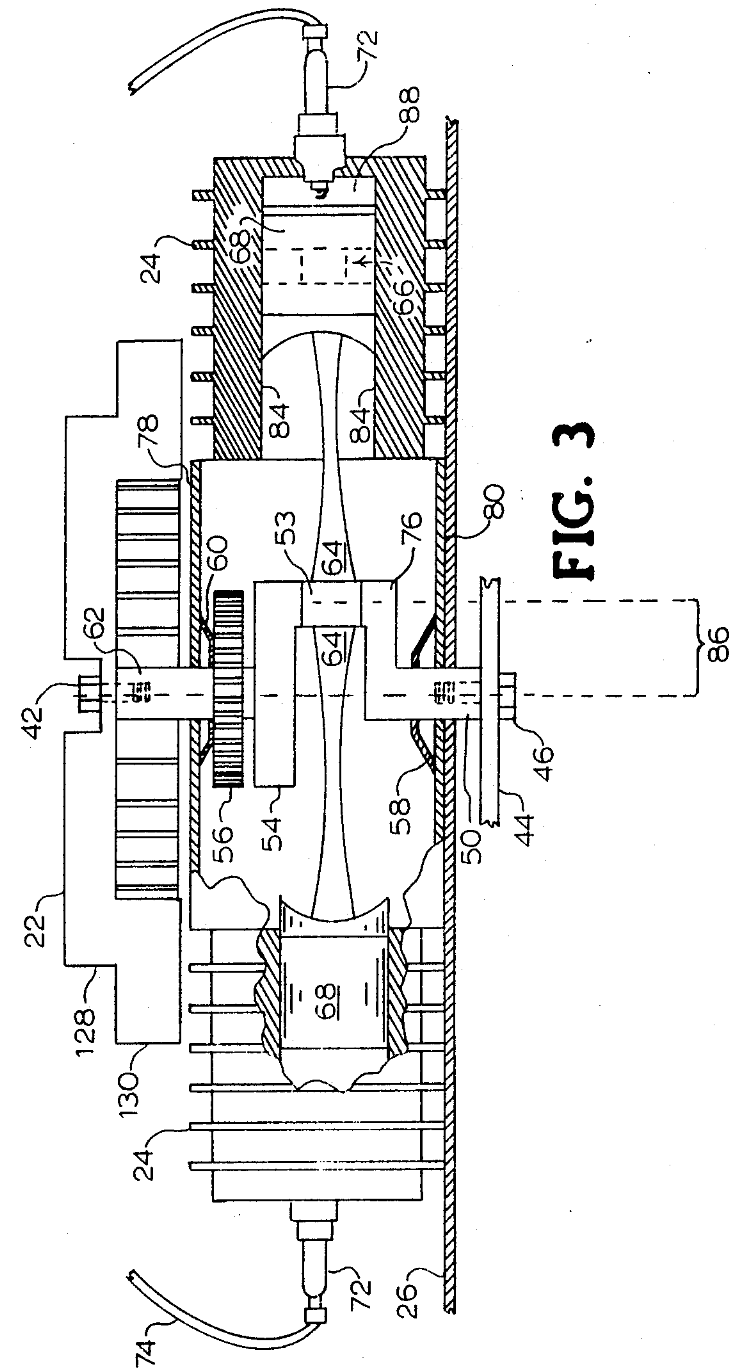
FIG. 3 is a simplified side elevation view, in section, of a portion of the lawnmower of FIGS. 1 and 2, in partial section, showing the details of construction of the engine.

FIG. 3 is a simplified side elevational view, partially broken away and partially in section, showing the details of the combustion chambers and crankcase, and associated portions of the internal combustion engine of FIG. 1 and 2.

As previously described with reference to FIGS. 2, and as shown in more detail in FIG. 3, a horizontally extending mowing blade 44 is secured to the lower end 50 of crankshaft 76 by means of blade attachment bolt 46. The lower end 50 of the crankshaft protrudes through the lower crankcase housing 80. An oil retaining lower main bearing 58 is provided to rotatably stabilize crankshaft 76 at lower end 50, such lower main bearing being mechanically or otherwise connected to the lower crankcase housing 80.

Crankshaft 76 is configured in a conventional offset crank arrangement commonly employed in internal combustion engine assemblies. Piston connecting rods 64 are attached, in a manner accommodating rotation of the crankshaft 76, at piston rod bearing surface 53. Crankshaft 76 is counter-weighted in a conventional manner by crankshaft counter-weight 54 in order to facilitate smooth running operation of the engine. Mounted vertically above crankshaft counter-weight 54 is a timing gear 56 which is connected to crankshaft 76 with the crankshaft 76 passing through the center of the timing gear. The upper portion 62 of crankshaft 76 protrudes through the crankcase upper housing 78 and is rotationally stabilized by the upper main bearing 60. The upper main bearing 60 is mechanically or otherwise secured to the crankcase upper housing 78.

Bearings 58, 60, and the bearings encompassing piston connecting rod bearing surface 52 can be formed of any suitable material of construction, as for example tin, lead, or cadmium-based "white metals," and other, harder materials of construction may be employed depending on the Brinell rating of the crankshaft.

Piston connecting rods 64 are each attached at one end to crankshaft 76 encompassing bearing surface 52, as previously described. At its opposite end, the piston connecting rods are mechanically coupled fastened to a pistons 68, wrist pin 66, wrist pin retaining clip 82 (not shown in FIG. 3) and a needle bearing system (also not shown) of a type commonly employed in the art.

Pistons 68 are slidingly retained within the cylinders by compression rings 70. The horizontal translation distance (stroke length) of the pistons 68 along the cylinder faces 84 is limited to the crankshaft offset dimension 86.

Initially, the rotation of the crankshaft is effected by an engine starting means (not shown in FIG. 3). However, once the engine is combusting fuel in a continuous cycle (Otto cycle), force is imparted to the head surfaces of the pistons by spark-ignited explosion of fuel within the combustion chamber 88. The force generated by the combustion forces the piston inwardly toward the crankshaft 76 along cylinder faces 84, so that the combustion energy is converted to rotational force by crankshaft 76. The spark required for ignition of the fuel/air mixture in the combustion chamber is provided by sparking means 72, as part of the ignition system which will be described hereinafter in greater detail.

In the engine construction shown in FIG. 3, the flywheel 22 is mounted in a fixed position relative to the upper portion 62 of crankshaft 76, by means of flywheel retaining bolt 42. The flywheel 22 is constructed so that it provides sufficient mass and angular momentum to maintain the angular velocity of crankshaft 76 at a selected desirable level between ignition strokes of the respective pistons. In this manner, a combustion cycle comprising intake of air/fuel mixture, compression, ignition and combustion, and exhaust of combusted air/fuel mixture, is carried out.

Figure 4:
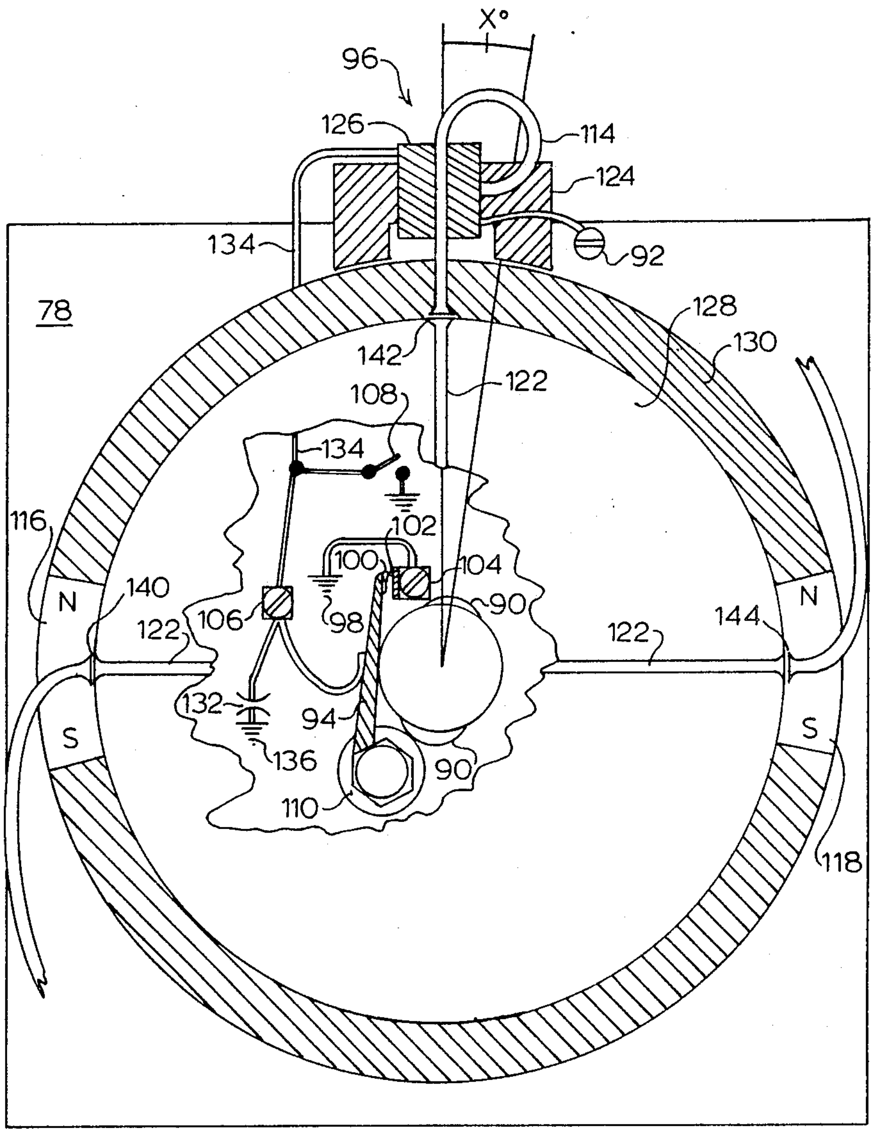
FIG. 4 is a top plan view, in partial section, of a portion of the internal combustion engine of FIGS. 1–3.

FIG. 4 is a top plan view of a flywheel-mounted ignition distribution system for an internal combustion engine, according to the present invention. For ease of description, all parts in FIG. 4 are numbered correspondingly to those of FIGS. 1–3 hereof. In the FIG. 4 drawing, a portion of the flywheel 22 has been illustrated as broken away in order to more fully illustrate the internal parts of the primary coil interruption circuitry.

In this ignition distribution system, crankshaft 76 is formed with integral camlobes 90 at its upper portion 62. The camlobes are employed to actuate the insulated interruptor lever 94, which is rotatably mounted on the upper surface of crankcase housing 78. Interruptor lever 94 rotates on an axis parallel to that of crankshaft 76, with interruptor lever spring 110 maintaining frictional contact between interruptor lever 94 and the upper portion 62 of the crankshaft 76 and camlobes 90. The insulated interruptor lever 94 is grounded through conductive contact points 100 and 102. Contact point 102 is mounted on an insulated mounting plate 104 and ultimately grounded at primary circuitry grounding contact 98.

The above described interruptor grounding system functions to ground the primary coil windings within the primary and secondary windings 126 which are wrapped around the ferrous frame laminates of stator 124. A common ground for the primary and secondary windings is afforded by common grounding screw 92.

A primary coil low tension conductor 134 carries any electromagnetic flux (EMF) induced current to the interruptor lever timing system and capacitor 132. The low tension conductor 134, capacitor 132, and interruptor lever grounding system (elements 110, 112, 90, 94, 146, 100, 102, 98, and 104) are conductively spliced at the insulated splicing plate 106. Capacitor 132 is grounded to the crankcase upon housing 78 at capacity grounding point 136.

The flywheel 22 comprises circumferentially spaced-apart magnets 116 and 118, having north and south extremities positioned as shown. These magnets are preferably diametrally opposite one another on the flywheel, and these magnets are essentially elements of the high-tension magneto system and spark current distribution system associated with the flywheel.

The magnets may be of any suitable material of construction, and preferably are of a ferrous laminate construction and are mechanically secured to or of integral construction with the peripheral region of the flywheel lower level portion 130.

In operation, the magnets 116 and 118 are rotated past the stator 124 during the rotation of the flywheel. As each of these magnets in sequence approaches the stator, an induced electromagnetic flux (EMF) is produced through the stator, resulting in passage of electrical current through the primary and secondary windings 126.

The high tension secondary coil conductor 114 at its end opposite the primary and secondary windings 126 terminates in a brush contact face for brush contact with the high tension distributing means 122 associated with the flywheel. The high tension distributing means 122 is insulated from the flywheel upper level portion 128, being conductive over its length, and upon rotation of the flywheel, the distributing means is brought into proximity with brush contacts 140, 142 and 144. These brush contacts are conductively associated with high tension conductors 74 and secondary coil conductor 114, respectively.

In this arrangement, the flywheel 22 is mounted to the crankshaft 76 upper portion 62 in selected relation to the camlobes 90. Low tension conductor 134 carries the primary coil current to capacitor 132 and insulated interruptor lever contact point 100.

Figure 5:
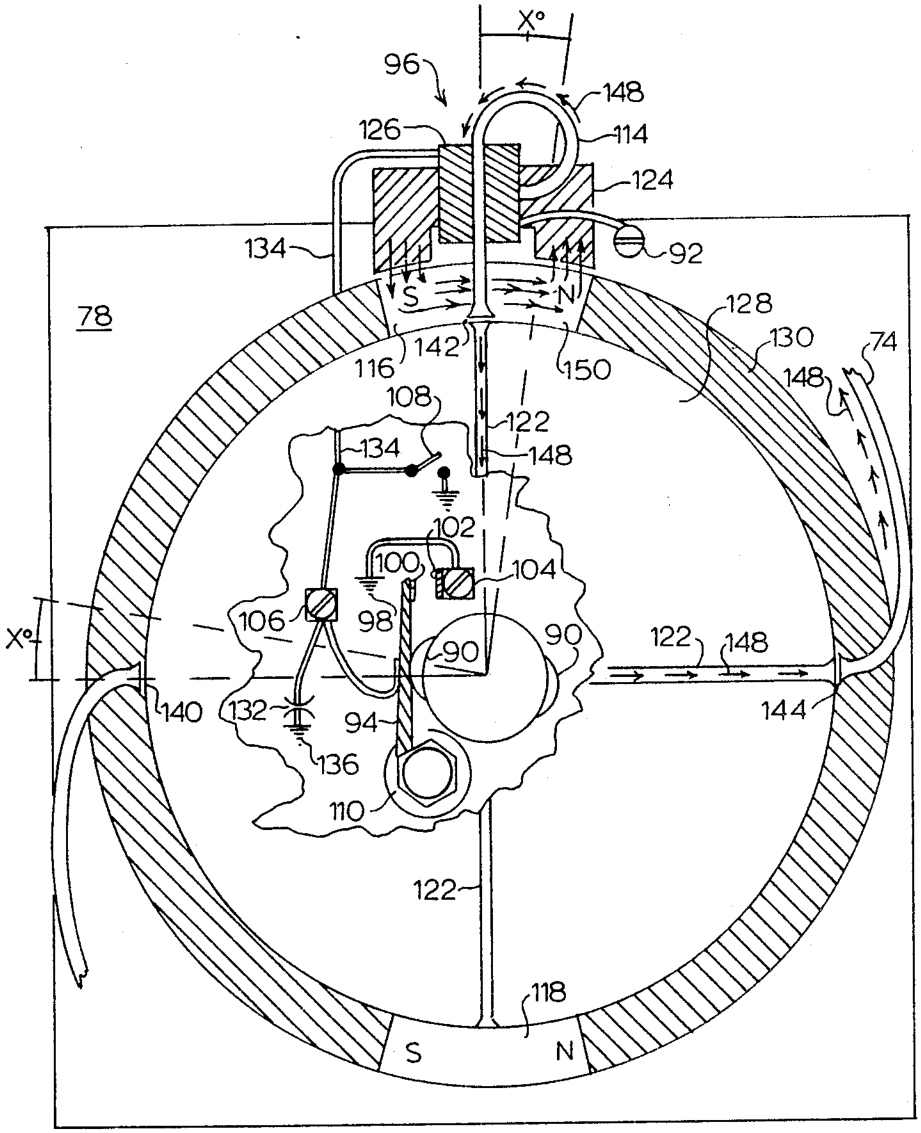
FIG. 5 is a top plan view of the FIG. 4 structure, showing the point breaker contacts of the switchable circuit in an open position, as compared with the closed position in FIG. 4, with the flywheel being rotated 90° relative to the position shown in FIG. 4.
Figure 6:
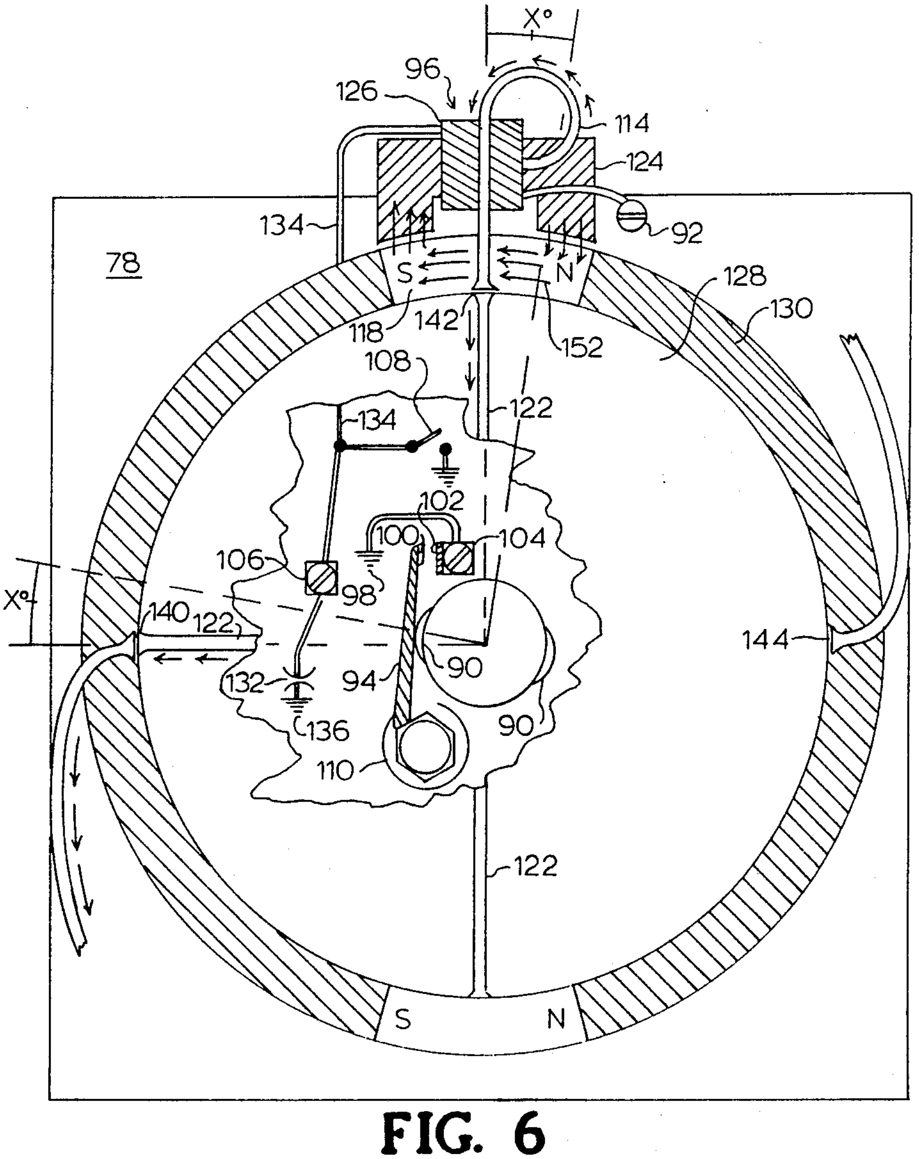
FIG. 6 is a top plan view of the portion of the internal combustion engine shown in FIGS. 4 and 5, partially broken away to show the details of the switchable circuit, and wherein the flywheel is rotated 180° relative to the flywheel position shown in FIG. 5.

FIGS. 5 and 6 are respective top plan views of the FIG. 4 system, wherein the flywheel has been rotated by arc lengths of 90° and 270°, respectively relative to the position of the flywheel shown in FIG. 4. In addition, FIGS. 5 and 6 have been correspondingly numbered with FIG. 4, for ease of description. FIGS. 5 and 6 thus are illustrative of the flywheel ignition and distributor system at selected positions occurring during the rotation of the crankshaft 76 during operation of the internal combustion engine.

In the position of the flywheel shown in FIG. 5, EMF 150 is induced through stator 124 by magnet 116 when the crankshaft 76 has been rotated 90° clockwise from the position of the crankshaft and flywheel shown in FIG. 4. FIG. 6 illustrates EMF 152 induced through stator 124 by magnet 118 when the crankshaft 76 and flywheel have been rotated 270° clockwise from the position of the crankshaft and flywheel shown in FIG. 4.

In operation, the high tension magneto system 96 functions as a generator having rotating magnets 116 and 118, with the magnets as the source means for generating EMF. The stationary armature (stator 124) is comprised of soft ferrous laminates. Lines of EMF 150 and 152 pass from north to south through the frame laminates of the stator and subsequently through the primary and secondary windings 126. The internal magnetic circuit is completed with the field from south to north as illustrated in FIGS. 5 and 6.

The high tension magneto system 96 is comprised of stator 124 and windings 126. The ratio of the low tension primary windings to high tension secondary windings of the primary secondary windings 126 is typically on the order of from about 1:50 to about 1:100. One end of the primary winding is conductively spliced to common grounding screw 92, and the other end is conductively spliced at the insulated splicing plate 106. The insulated splicing plate is conductively connected to capacitor 132 and the contact point 100.

The primary circuit is completed through contact point 100 when such contact point is in conductive abutment with contact point 102. Contact 102 is grounded to the upper housing of the crankcase at the same grounding surface associated with common grounding point 92. The contact points 100 and 102 are actuated by the movement of the interruptor lever arm 94. The interruptor lever arm 94 in turn is actuated by the rotation of camlobes 90.

To shut off the engine, it is essential to keep the resistance of the primary circuit low. Cutoff switch 108 is employed to short circuit the primary coil to in turn stop the engine. If a series switch were employed, the resistance of the primary coil may tend to be excessive and a sparking current could then be generated within the secondary coil.

One end of the secondary winding is grounded jointly with the primary winding, at common grounding screw 92. The other end of the secondary coil is conductively spliced to high tension conductor 114. The high tension conductor 114 terminates at one end in a brush contact 142 which is in brush contacting relationship to the flywheel mounted conductive distributing means 122. A high tension electrical signal is conducted along path 148 in the direction indicated by arrows in FIGS. 5 and 6, to the sparking means 72 (see FIG. 3). The contact points 100 and 102 function to keep the primary circuit closed until the magnets 116, 118, approach the stator 124, at which time the interruption lever 94 is actuated by camlobes 90 to open the primary circuit at a pre-determined anticipatory angle X (see FIGS. 5 and 6). Once the interruption lever has opened the contact points, the primary circuit is incomplete, and high EMF is induced into the secondary coil, which in turn causes a rapid rise in current conducted by high tension conductor 114. At the time of actuation of interruptor lever 94, the capacitor 132 across contact points 100 and 102 absorbs, with little loss, the spark energy that would otherwise appear as an arc between the contact points. This current later is dissipated into the primary circuit as an oscillatory discharge.

Figure 7:
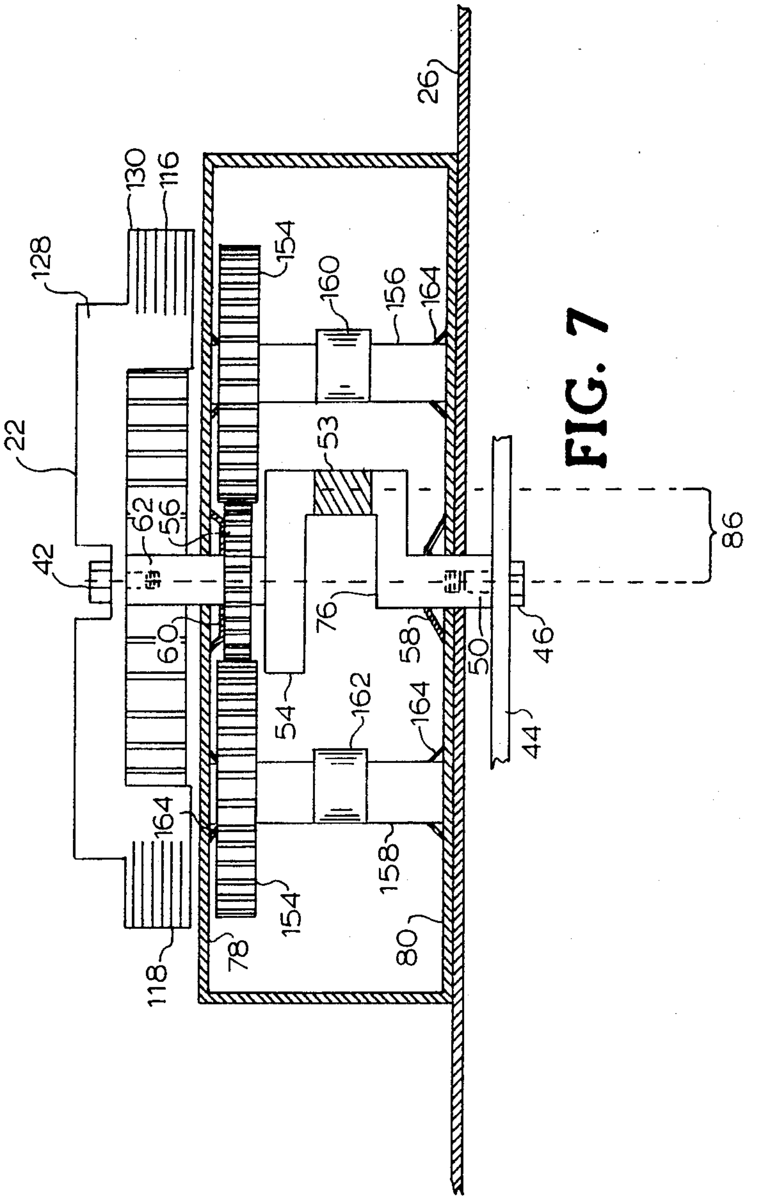
FIG. 7 is a side elevation view in section of a portion of the internal combustion engine of FIGS. 1–6, in partial section, and with some parts omitted for clarity, to show the details of construction of the crankcase portion of the engine.

FIG. 7 is a simplified cut-away elevation view of a portion of a low profile engine in accordance with the present invention, wherein the parts and elements are numbered correspondingly with respect to the preceding drawings. This internal combustion engine embodiment of the invention features a dual camshaft arrangement which advantageously further lowers the profile of the internal combustion engine. The dual camshafts are rotated in a selected ratio relative to the rotation of crankshaft 76.

Timing gear 56 is operatively coactive with the camshaft timing gears 154, which are mechanically or otherwise coaxially secured to the upper ends of camshafts 156 and 158. These camshafts are mechanically rotatably secured in the engine, in relation to the crankshaft as illustrated, by camshaft retaining bearings 164. The upper and lower camshaft retaining bearings are mechanically or otherwise secured to the crankcase upper and lower housings 78 and 80, respectively.

Upon rotation of crankshaft 76 during operation of the engine, the camshaft are simultaneously rotated by the coaction of timing gear 56 with timing gears 154.

Camshaft lobes 160 and 162 are provided as integrally formed portions of camshafts 156 and 158, so that rotation of camshafts 156 and 158 entails the rotation of camlobes 160 and 162. The offset raised portion of the camlobe surface is provided so that upon rotation of the camshaft it actuates a valve lifting cam follower (not shown). Thus, the motion of the pistons within the cylinders is in selected relationship to the actuation of the valve lifting cam followers, as is more fully appreciated from the ensuing description of FIG. 8.

Figure 8:
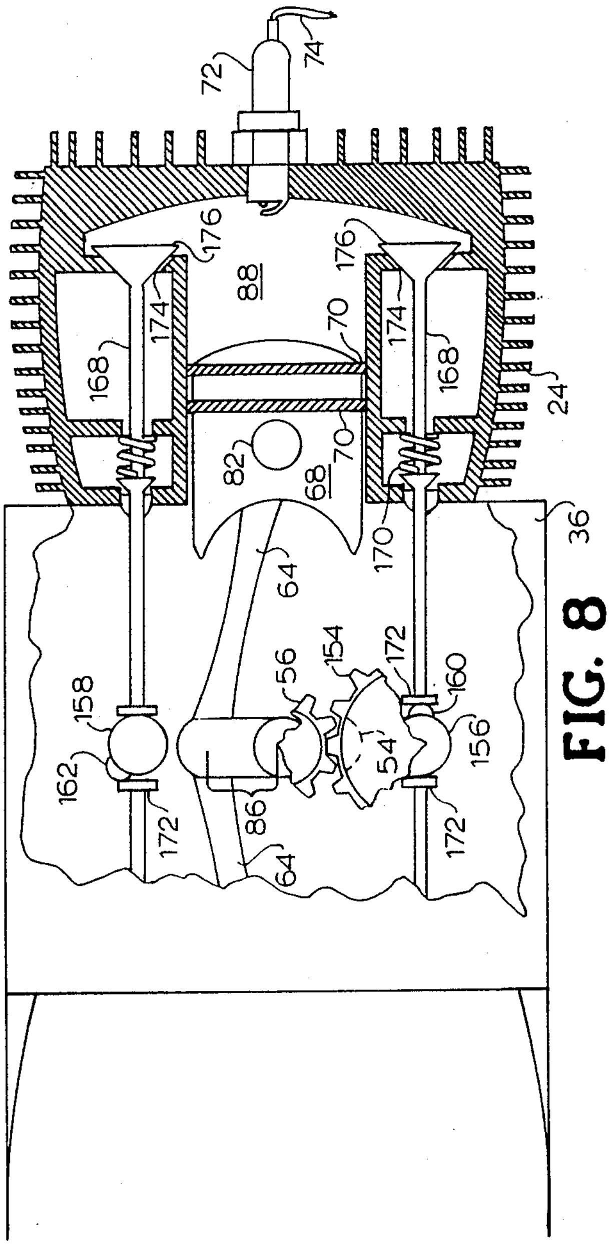
FIG. 8 is a top plan view in partial cross-section, of a portion of the internal combustion engine according to one embodiment of the present invention, showing the details of the combustion chamber and crankcase of the engine.

FIG. 8 is a top plan cut-away view of the crankcase of the internal combustion engine according to one embodiment of the invention, wherein all parts and elements are numbered correspondingly with respect to the preceding drawings. The upper housing of the crankcase has been cut away in this drawing to illustrate the valve arrangement. The camshaft timing gear 154 has been cut away to expose the camshafts 156 and camlobes 160. Camshaft timing gear 154 has been removed from the top of camshaft 158 in this drawing to expose camshaft 158 and camshaft lobe 162 as well as the crankshaft offset dimension 86. Camshaft following means 172 are integrally formed at one end of the valve stems 168, and valve heads 176 are integrally formed at the opposite end thereof.

As previously described in connection with the FIG. 7 drawing, valve heads 176 are lifted from value seats 174 by rotation of camshafts 156 and 158. The camshaft followers stay within frictional contact of the camlobes 160 and 162 due to the force applied by following springs 170. The specific arrangement, features, and operation of valve heads 176, camlobes 160, 162, valve seats 174, and timing gears 154, will be appreciated by those skilled in the art, as regards their character.

Figure 9:
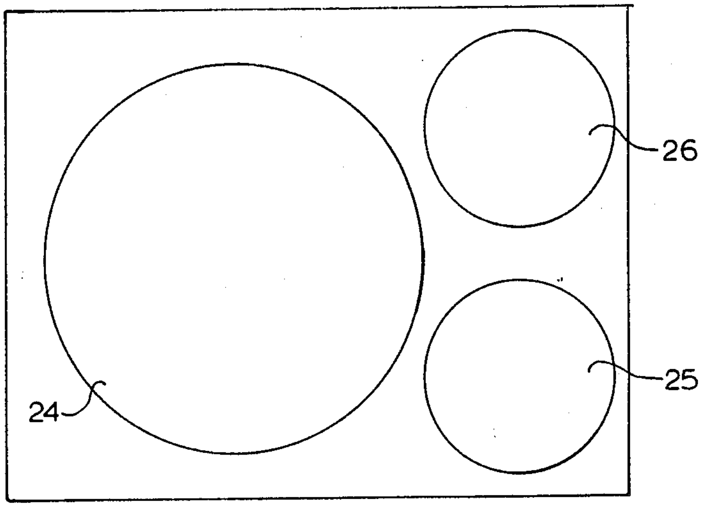
FIG. 9 is a schematic representation of a face of a cylinderhead of an L-head internal combustion engine.
Figure 10:
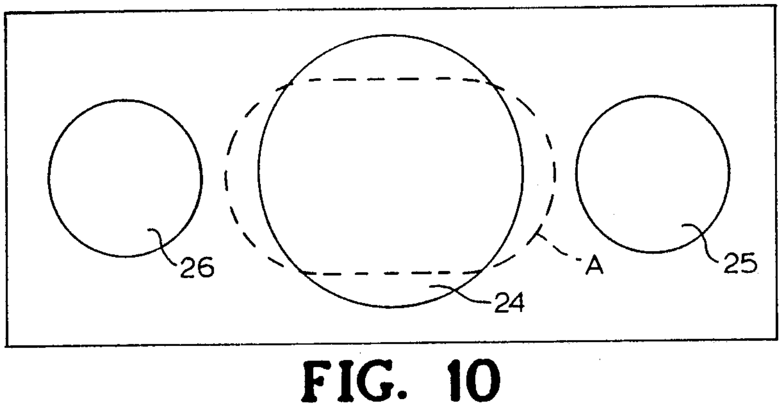
FIG. 10 is a schematic representation of a face of a cylinder head of an internal combustion engine, of a low profile type according to the present invention, in one embodiment thereof.

The lateral arrangement of valves in the T-head configuration shown affords a profile reduction advantage which achieves a substantial advantage over standard internal combustion engines of a type employed on push type lawnmowers, which utilize L-head configuration, as will be more fully appreciated in connection with the ensuing description of FIGS. 9 and 10 herein.

It should be recognized that the foregoing illustrative discussion is in no way limiting to the methods which may be employed in the broad practice of the invention for lifting valves from their respective valve seats. An engine employing an opposing T-head arrangement can be substantially lower in profile than those engine configurations employed by the prior art. A comparative example of this advantage of the low profile engine of the present invention is illustrated by comparative FIGS. 9 and 10.

FIG. 9 is a simplified schematic representation of an L-type cylinder head with the compression head removed to reveal the bored passages for the piston 24 and valve heads 25 and 26.

FIG. 10 shows a corresponding T-type cylinder head configuration which may be employed in the internal combustion engine of the present invention, as illustratively described in connection with the preceding drawings.

For comparison purposes, the L-type cylinder head shown in FIG. 9 may have an illustrative cylinder diameter of 2.5 inches with a piston stroke length of 2.5 inches, and with the height (vertical dimension as shown in FIG. 9) of the cylinder head being 3.1 inches. The stroke volume displacement of the piston 24 in this L-type cylinder head is 6.13 cubic inches.

On an equal cylinder displacement basis, utilizing the same stroke length of 2.5 inches, the T-type cylinder head shown in FIG. 10 may utilize a cylinder having a diameter of 1.77 inches, together with valves 25 and 26 having the same size. The one cylinder L-type cylinder head of FIG. 9, which is characteristic of conventional lawnmower engines, thus may be replaced by a two cylinder T-type cylinder head in accordance with the present invention to achieve a substantial reduction in engine height. Thus, the vertical height of the cylinder head as illustrated in FIG. 10 may be only 2.1 inches, a reduction of over 32% relative to the height of the corresponding FIG. 9 L-type cylinder head, while keeping the total engine displacement constant.

Another advantage of the opposed cylinder internal combustion engine of the present invention is that the valve size is not limited by the usual center-to-center distance between the cylinders, as is the case in most multiple cylinder internal combustion engines.

A modification which would further lower the profile of the cylinder heads, while retaining the required total displacement of the internal combustion engine, entails the use of laterally ovoid cylinders and pistons, corresponding to the shape identified by dashed lined A in FIG. 10. Ovoid cylinders and corresponding ovoid pistons corresponding to this dashed line shape could be formed of cast or machined metals, molded heat resistant plastics, ceramics, etc., and afford a potentially significant advantage in reducing the height of the internal combustion engine with which the same are employed.

It will be recognized by those skilled in the art that it is possible to modify the low-profile cylinder head shown in FIG. 10 to position the piston 24 on one side of the paired valves 25 and 26, rather than the configuration shown in the drawing, wherein piston 24 is interposed between valves 25 and 26. In other words, rather than the left-to-right sequence shown in FIG. 10 of valve 26, piston 24, and valve 25, the engine may be reconfigured, while retaining the same low profile, with an arrangement entailing a left-to-right sequence of piston 24, valve 26, and valve 25.

Figure 11:
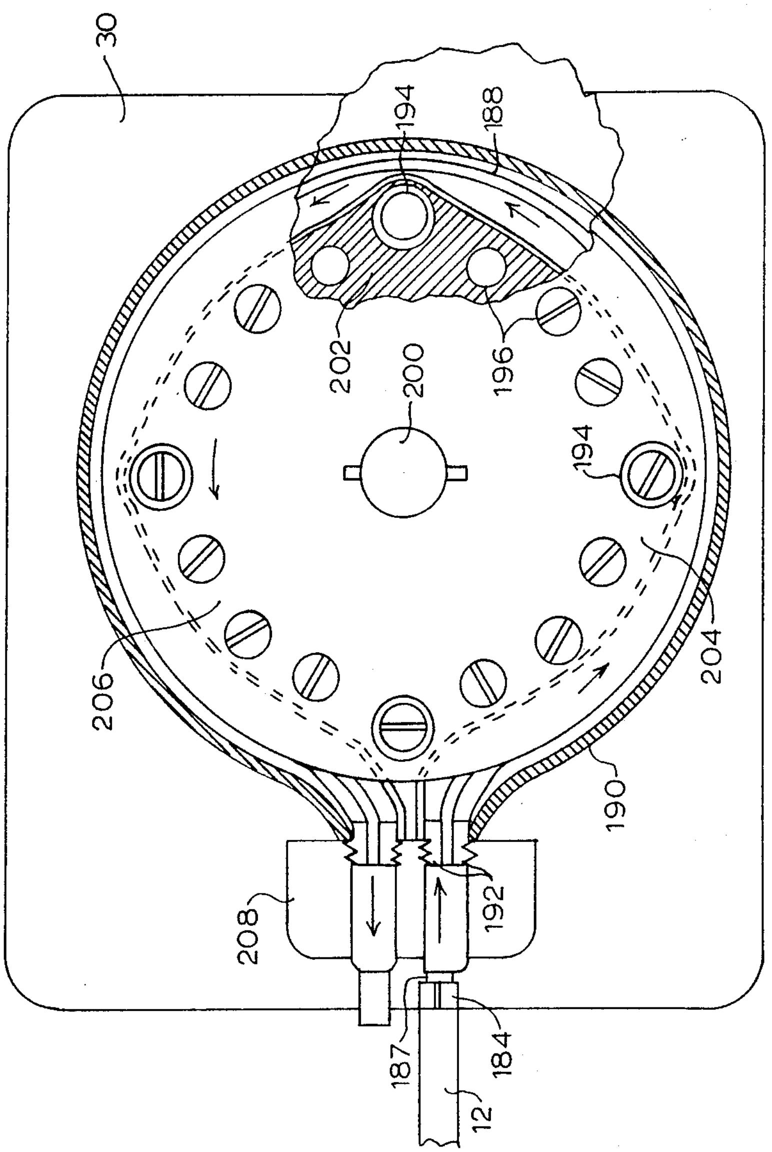
FIG. 11 is a top plan view of a pump head of a peristaltic pump which may usefully be employed as a part of a hydraulic starter system for an internal combustion engine, in accordance with the present invention.

Referring now to FIG. 11, there is shown a top plan view, partially broken away, of a peristaltic pump such as may be usefully employed in a hydraulic starter system for an internal combustion engine, such as the type illustratively described hereinabove. The structural assembly shown in FIG. 11, when employed as a recipient rather than prime mover element, may be employed as a hydraulic peristaltic motor, as will be appreciated from the following description.

Figure 12:
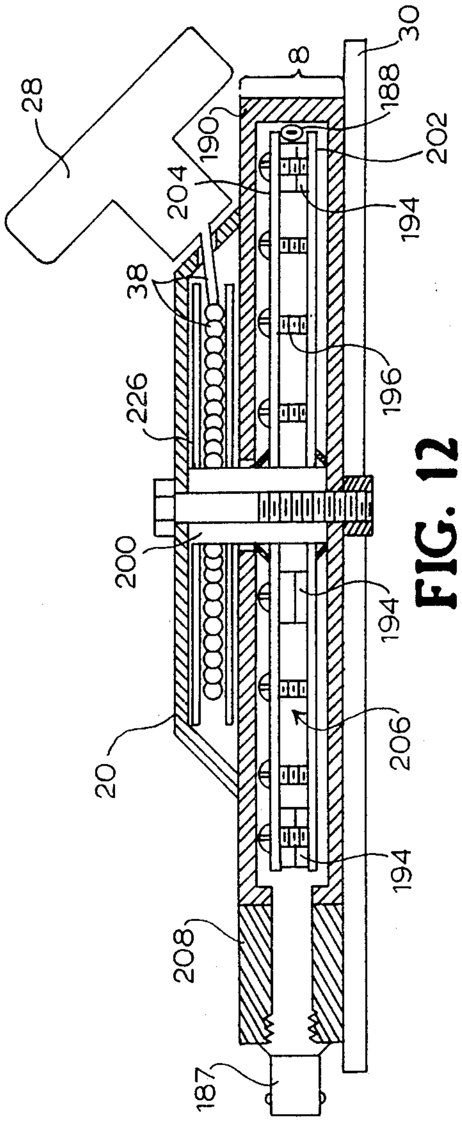
FIG. 12 is a side elevation view, in partial section, of a recoil driven peristaltic pump utilizing a pump head of the type shown in FIG. 11, as a part of a hydraulic starter system for an internal combustion engine.
Figure 13:
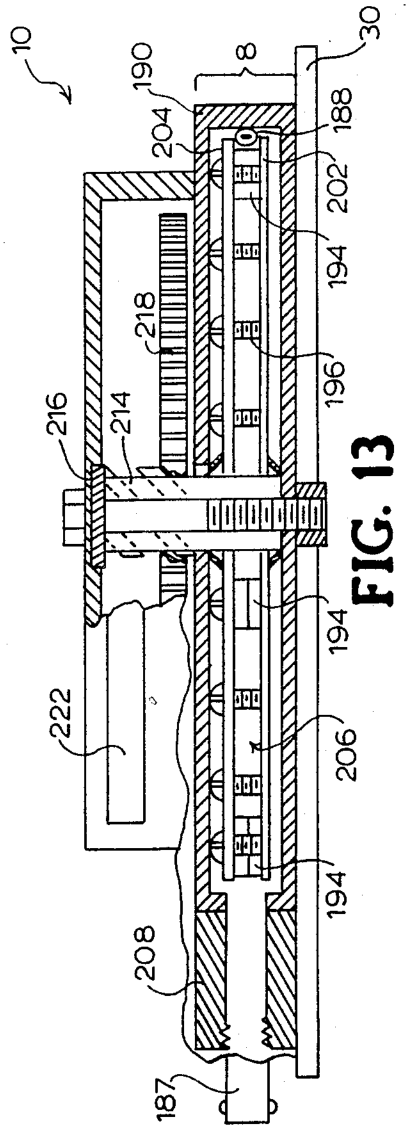
FIG. 13 is a side elevation view, in partial section, of a peristaltic starter which may be usefully employed with an internal combustion engine, in accordance with the present invention, and in conjunction with the recoil driven peristaltic pump shown in FIG. 12, as part of a hydraulic starter system for an internal combustion engine.

In the following description of FIGS. 11–13 illustrating the hydraulic starter system of the invention, all parts and elements are numbered correspondingly with respect to FIG. 1.

The hydraulic flow circuit 13 comprising the peristaltic pump/motor means is a closed loop (see FIG. 1) made up of flow conduits comprising: oil uptake hose 12, resilient tubing pumping section 188, and pressurized hose 14.

The following description will be directed to the use of the peristaltic device as a peristaltic starting pump means, and a description of a corresponding peristaltic starting motor will follow such description.

As previously described with reference to FIG. 1, the hydraulic flow circuit comprises an oil uptake hose which at a first lower end is submerged within the oil sump of the internal combustion engine, and in proximity to the connection with the engine the oil uptake hose 12 has disposed therein a check valve 185 to retain oil in the hose after shutting off the hydraulic system, so that priming of the peristaltic pump in the flow circuit is not required to initiate subsequent operation of the starter system and associated internal combustion engine. At its second end, the uptake hose 12 features a clamping means 184 securing the second end of the hose to the intake nipple 187. The intake nipple 187 is mechanically or otherwise secured to a nipple anchoring means 208. Anchoring means 208 may for example comprise an anchoring block, and such means and the pump housing 190 are mechanically or otherwise secured to mounting plate 30, the orientation of which is more fully shown in reference to the lawnmower to which same may be attached, in FIGS. 1 and 2.

As illustrated in FIG. 11, the pump impeller/head assembly 206 comprises an impeller base 202, impeller top guide means 204, and inset screws 196 for rigidly attaching the base guide means to the top guide means. The impeller/head assembly 206 is positioned in a selected relation to rotatable bushing 200, with the bushing being rotated by recoil starting means, as hereinafter more fully discussed in connection with FIG. 12.

In this fashion, the pump impeller/head assembly is positioned for rotation about a fixed axis.

Secured between the impeller upper and lower guide members, by suitable mechanical fastener means, e.g., bolt or screw means, for independent rotation about respective axis parallel to the central axis of the impeller/head assembly, are four circumferentially spaced-apart rollers 194.

The anchoring means (block) 208 anchors the end segments of the resilient tube pumping section 188. In this arrangement, the tubing forming the pumping section is tensionally extended around the rollers 194 and the inset screws 196. Tubing simultaneously is engaged and compressed by at least three of the four circumferentially spaced apart rollers, with at least partial closure of the tubing at the points of compression, as illustrated at one of such rollers in FIG. 12. The rollers 194 are mounted for longitudinal movement of the respective compression points along the tubing while the tubing is being compressed between the rollers and the inner wall of pump housing 190. Oil or other hydraulic fluid thereby is advanced through the compressed tubing section during rotation of the pump impeller/head assembly 206.

The resilient tube pumping section 188 is anchored at both ends to block anchoring nipples 192 in order to retain the position of tubing. In this arrangement, the peristaltic pumping section of the tubing must be both flexible and resilient so that under conditions of continuously varying tensional and compressive load conditions the tubing does not tend to fatigue and crack in use, and so that the tubing quickly reacquires its undeformed shape and dimensions subsequent to being contacted by the respective rollers. These elastic properties of the tubing are most critical immediately after the direct bearing pressure on the tubing is released, as the roller moves along the length of the tubing. The tubing therefore may be formed of a flexible resilient material such as cylastic or other polymeric materials possessing the required mechanical properties and resistance to degradation in the presence of the oil or other hydraulic fluid being flowed through such tubing.

It will be appreciated by those skilled in the art that either a manual recoil pumping means such as is shown in FIG. 12, or a throw gear-type starting means such as is shown in FIG. 13, may power or be powered by a peristaltic pump/motor, in the hydraulic starting system of the present invention.

More specifically, FIG. 12 is a side elevation view, with part of the pump housing 190 broken away to further illustrate the coaction of a recoil starter assembly 20 with peristaltic pump 8. The recoil starting assembly comprises a clock spring recoil ratchet pulley 226 which has concentrically wrapped about its circumference a recoil cord 38, such that pulling of pull handle 28 by the user will rotate the pulley and actively engage the rotatable bushing 200 mechanically keyed to peristaltic pump 8. Rotation of the peristaltic pump 8 by the rotation of the recoil starting assembly provides the necessary hydraulic pressure to rotate the peristaltic starting motor 10 illustrated in FIG. 13.

As shown in FIG. 13, peristaltic starting motor 10 has mechanically keyed to the center of the pump impeller/head assembly 206 a threaded rotatable bushing 214. This bushing has, as an integral part thereof, an extended upper portion which is threaded to accommodate a throw-type starting gear 218. Upon rotation of the starting motor 10 starting gear 218 "rides up" the threaded portion of rotatable bushing 214 and is finally blocked at the top of the threaded portion by a gear stop 216. When starting gear reaches its upper limit and can no longer vertically climb the threads of threaded bushing 214, it must rotate in direct relation to the starting motor 10. The rising action of the starting gear simultaneously causes engagement of the gear through window 222 with matched teeth reposed on the flywheel 22. Upon full engagement of the starting gear with the gear stop 216 and flywheel gear teeth, the starting gear will begin to rotate the flywheel to commence the starting of internal combustion engine 4.

While the invention has been described with reference to specific aspects, features, and embodiments it will be appreciated that numerous other variations, modifications, and embodiments are possible, and all such other variations, modifications, and embodiments therefore are to be regarded as being within the spirit and scope of the invention.

What is claimed is:

1. A low-profile internal combustion engine, comprising:

(a) an engine block of elongate form including a medial crank case section and at least two cylinder head sections extending laterally from the crank case section;

each said cylinder head section defining a cylinder in which is positioned a piston;

a crankshaft mounted in the crankcase section, coupled with the piston in each said cylinder, and in operative relationship to a pair of camshafts for rotating the camshafts concurrently with rotation of the crankshaft;

each pair of camshafts comprising a first camshaft coupled with a first intake valve element on each of said cylinders and a second camshaft coupled with an intake valve element for a said cylinder and a second camshaft coupled with an exhaust valve element for the said cylinder;

means for forming and selectively introducing an air/fuel mixture into said cylinders, and means for selectively exhausting combusted air/fuel mixture therefrom subsequent to combustion in said cylinder;

means for selectively initiating combustion in each said cylinder in a pre-determined sequence, including:

(i) a flywheel mounted coaxially to said crankshaft for rotation and including on its periphery diametrally opposed magnets each of which extends circumferentially along the flywheel periphery for an arc length denoted pheta, the extremities being north and south regions of the respective magnets;

(ii) a branched insulated conductor mounted on the flywheel and including three separate branches terminating at the periphery of the flywheel forming brush structures in circumferentially spaced relationship to one another;

(iii) a stator mounted in peripheral proximity to the flywheel;

(iv) a coil comprising primary and secondary winding circumscribing said stator;

(v) a common ground for said primary and secondary winding;

(vi) a high tension conductor coupled to the secondary winding and terminating at a brush face positioned and aligned to brushingly engage the brush structure of the branched insulated conductor upon rotation of the flywheel;

(vii) a low tension low resistance conductor joined at one end to said primary winding and joined at the second end to (a) a ground switch for selectively grounding said primary winding, to deactivate the engine, and (b) a primary coil circuit interruption system operable when said ground switch is in an open position, comprising:

(1) an insulated interruptor lever in serially actuatable relationship to camsurfaces of said crankshaft for selective positioning of said lever in either of selected positions comprising a first closed position closing and completing a ground circuit including said common ground, and a second position in which the ground circuit is open and the primary coil is in an inactive mode with respect to induction of electromotive force (EMF);

each said cylinder having associated therewith a conductor joined at one end to a spark generating means mounted in operative relationship to said cylinder and terminating at a second end in a brush face position and aligned to brushingly engage the brush structures of the branched insulated conductor upon rotation of the flywheel;

the arc length pheta, the stator dimensions and arrangement, and the circumferential spacing between branches of said branched insulated conductor, and positions of said brush faces of said conductors and said high tension conductor, being selected such that upon rotation of said flywheel, when said flywheel magnets translate successively into proximity to said stator, EMF is generated and induced current passes through said secondary coil to said high tension conductor for flow through a branch of the branched insulated conductor next coming into brushing relationship with said brush face of said high tension conductor to a branch whose brush face concurrently comes into brushing relationship with the brush face of said conductor joined to said spark generating means.

2. An internal combustion engine according to claim 1, comprising two cylinders.

3. An internal combustion engine according to claim 1, comprising pistons of circular cross-section.

4. An internal combustion engine according to claim 1, comprising pistons of lateral ovoid cross-sectional shape.

5. A lawnmower comprising an internal combustion engine according to claim 1, operatively connected to blade means secured to a lower portion of said crankshaft.

6. An internal combustion engine according to claim 1, further comprising a hydraulic starter system.

7. An internal combustion engine according to claim 6, wherein said hydraulic starter system comprises a peristaltic starter motor and a recoil starter actuated peristaltic pump in a flow circuit coupled to an oil sump of said internal combustion engine.

8. A lawnmower comprising an internal combustion engine and hydraulic starter system, according to claim 7.

9. A hydraulic starter system for an internal combustion engine of a type having a crankcase sump for retaining engine lubricating fluid, said hydraulic starter system comprising:

a hydraulic fluid flow circuit joined in fluid flow communication with said crankcase sump of said internal combustion engine;

a first peristaltic pump coupled to said flow circuit, said first peristaltic pump being operatively associated with manually actuated recoil starter means, for selective actuation of said first peristaltic pump to flow hydraulic fluid through said flow circuit;

a second hydraulic peristaltic motor coupled to said flow circuit, and operatively connected to engage said internal combustion engine for cranking thereof to initiate its operation.

* * * * *